United States Patent Office 2,802,749
Patented Aug. 13, 1957

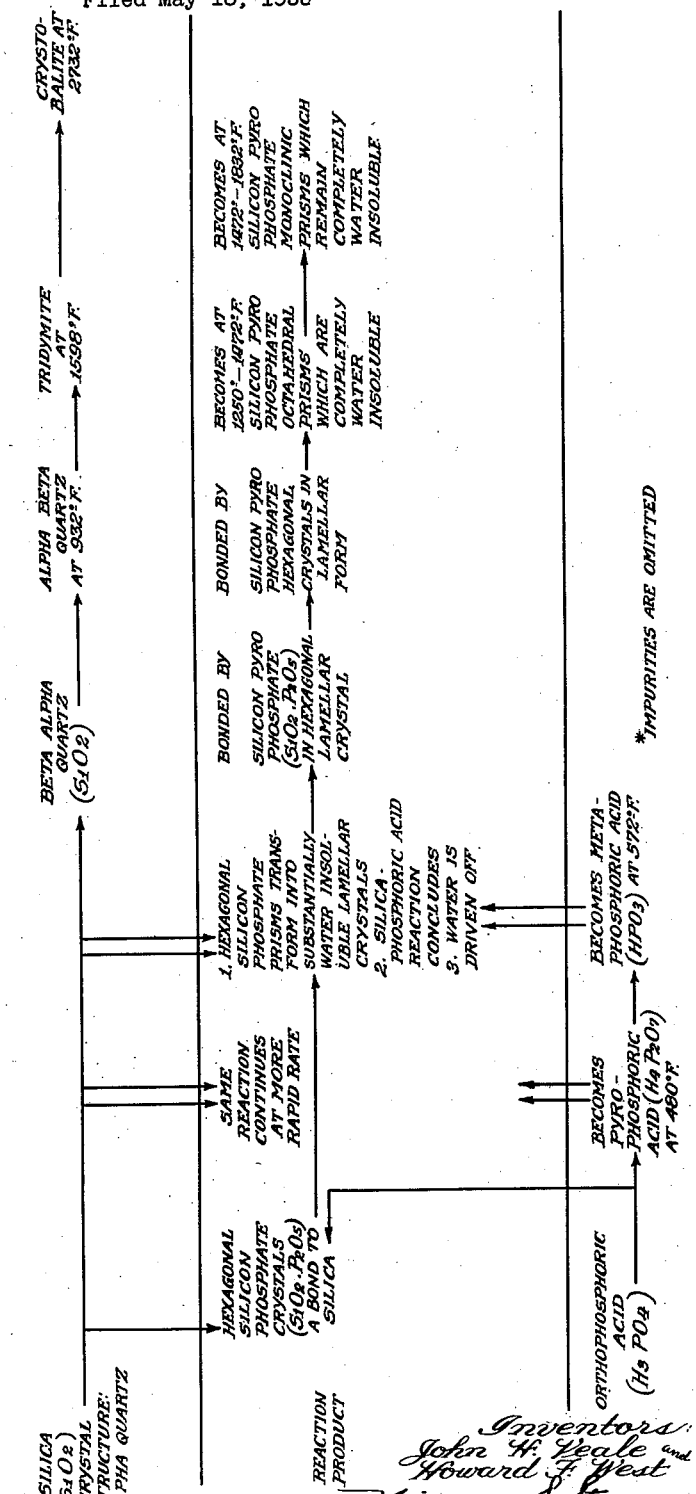

2,802,749

CHEMICALLY BONDED SILICA BRICK

Howard F. West and John H. Veale, Joliet, Ill., assignors to The Illinois Clay Products Company, Joliet, Ill., a corporation of Illinois Application May 18, 1953, Serial No. 355,876

10 Claims. (Cl. 106—69)

This invention relates to a chemically bonded silica brick, and particularly to a phosphate bonded silica brick.

Silica brick in present commercial use is made by mixing granulated silica with 2% to 3% lime and about 1% of an organic binder, dry pressing the composition into the form of a brick, drying at 200° F. to 300° F. and then burning or firing at about 2500° F. The organic binder is used to give strength before firing, sometimes called green strength. The organic binder largely volatilizes during firing with resulting lowering of the density of the silica brick and decrease in its strength. The lime on firing the brick produces a vitreous bond but has the disadvantage of lowering the fusion point below that which could be obtained with pure silica. These lime-containing silica bricks withstand temperatures about as high as 3000° F.

An object of this invention is to provide a substantially pure silica brick which will withstand higher temperatures than the lime-containing silica bricks now in commercial use.

Silica bricks are generally made with ganister or like forms of granulated alpha quartz. On firing or otherwise heating at above 900° F. the alpha quartz passes from the alpha quartz form to beta quartz and then to more complex crystalline structures called tridymite and crystobalite. During the burning or firing there may be an expansion of as much as ½ inch per linear foot. Upon cooling spalling occurs in 10% to 25% of the burned bricks. Sometimes the bricks are completely cracked, but more generally the edges and corners are broken, which is enough to render the bricks unsaleable. An object of this invention is to provide a method of producing a silica brick which avoids losses due to spalling.

Another object is to provide a method of producing a chemically bonded, substantially pure, quartz silica brick.

A further object is to provide a method of producing a chemically bonded, substantially pure, silica brick composed predominantly of crystobalite.

Another object is to provide a silica brick of high density and improved hot strength.

In accordance with one embodiment of this invention, granulated silica of 99% or greater purity is mixed with pyro or metaphosphoric acid in sufficient amount, such as 4% to 10%, to hold the silica particles together in a coherent mass. The composition is then dry pressed in the shape of a brick or other body, and then heated at a temperature of at least approximately 680° F. to react the phosphoric acid with at least the surface of the silica and to form a silicon phosphate which is believed to be ($SiO_2.P_2O_5$), which is less soluble and more water resistant than prismatic hexagonal silicon phosphate which forms at lower temperatures. After heating for a few hours to insure complete conversion of the silicon phosphate to a water resistant form, the temperature of the body is lowered to room temperature, after which the body is ready for shipment and high temperature refractory use.

Any form of silica may be used in the process. However, where it is desired to keep expansion under service conditions at a minimum, best results are obtained by heating the bricks to above 2500° F. for several hours to convert alpha quartz to crystobalite or granulated crystobalite is itself mixed with the phosphoric acid instead of using the alpha quartz. In some cases expansion at high temperatures is not important, and in such cases the alpha quartz is mixed with the phosphoric acid and the temperature is maintained between 680° to 900° F., thus avoiding change of the alpha quartz to beta quartz, or to tridymite or crystobalite with consequent expansion, distortion and risk of breakage.

The process is preferably carried out with substantially pure silica in order to obtain a silica refractory having maximum resistance to high temperatures. The preferred composition after heating to above 680° F. consists essentially of silica granules bonded together with water resistant silicon phosphate. Other materials may be present with the silica generally in minor amounts. When basic materials such as alumina or lime are present, the pyro- or metaphosphoric acid is used in excess of the amount required to react with the basic material in order to provide the sticky phosphoric acid bond before heating and a silicon phosphate bond after heating in addition to the phosphate bond obtained from the basic material. Thus the pyro- and metaphosphoric acid give an improved bond for silica brick containing basic material, as well as for the preferred pure silica brick and silica brick containing additional non-basic refractory material.

In order to obtain the water resistance which is commercially desirable, applicants have found that the temperature should be raised to at least 680° F., at which temperature the hexagonal crystals transform into a lamellar form which is more water resistant than the hexagonal form, and into other crystal forms at higher temperatures which are also water resistant.

The following examples are given to illustrate the invention:

EXAMPLE I.—SILICA BRICK BONDED BY PHOSPHATES AT 700° F.

A successful chemically bonded silica brick is made as follows: To ganister ground to a fineness to pass a 6-mesh screen and at room temperature is added 5% by weight of concentrated (100% pure) pyrophosphoric acid at a temperature of about 350° F. This temperature is critical only to the extent that the phosphoric acid should be in a very liquid state so that it readily mixes with the ganister. The mixing requires two or three minutes, during which time the temperature of the phosphoric acid is brought down to approximately the room temperature of the ganister. The product is a sticky mass which can be molded in the hand and readily formed with the brick press. This quality of the phosphoric acid of forming a moldable mass at room temperature is important because it provides a physical interlocking of the constituents when pressed into bricks. The bricks are then pressed and placed in a drying oven where they are brought up to a temperature of 700° F. and held for four or five hours. The temperature should be not less than that required to transform the hexagonal silicon phosphate crystals into a lamellar form, generally stated to be 680° F. or 360° C.

After removal from the drier and cooling to room temperature, the brick shows no spalling or cracking. Its edges and corners are sharply defined. There are no rejects. Upon cracking open the brick, silicon phosphate crystals can be seen. The modulus of rupture is over 1000 p. s. i., the density 1.20 oz. per cubic inch. The crystalline structure of the silica is in alpha quartz form.

The bricks' color is light and has a pinkish cast. This color is dependent in part upon the percentage of impurities in the ganister and the over-all crystalline structure of both the uncombined silica and the silicon phosphates. The ganister in this experiment was 99% pure silica.

EXAMPLE II.—SILICA BRICK BONDED BY PHOSPHATES AT 500° F.

A brick mixed and pressed in the same batch as Example I is dried at 500° F. instead of 700° F. After it has returned to room temperature, if the brick is immediately examined and tested, it has much the same properties, characteristics and appearance as Example I brick. If this brick then stands in the room, it will absorb moisture and the rapidity of absorption will depend upon the humidity of the air. In a room of average humidity, within two or three days, this very hard brick will soften, indicating a reaction between the water and the composition of the brick. It is possible with just the hands to break off portions and to break the brick in two. This is to be contrasted with Example I brick, mixed from the same batch, which may be stacked in the open for weeks and be rained upon for weeks without perceptibly altering its characteristics, properties or appearance.

The following drawing shows a comparison of the Example I and II bricks with a commercial lime-containing silica brick:

|  | Modulus of rupture when wet after exposure to water for 48 hours, p. s. i. | Density, oz. per cubic inch | Pyrometric cone equivalent (P. C. E.) |
| --- | --- | --- | --- |
| Example I | 960 | 1.20 | 32–33 (3,150° F.). |
| Example II | 250 | 1.20 | 32–33. |
| Commercial silica brick | | 1.10 | 31–32 (3,075° F.). |

*The theory of the chemically bonded silica brick*

The accompanying drawing shows the changes in the composition of applicants' brick first from the time it is mixed to the time it is in saleable form, column 5, and then the changes that occur during the first heating after erection in a furnace.

The explanation for the different qualities of Example I and Example II bricks resides in the fact that, while the phosphate crystals remain hexagonal prisms during the drying of the Example I brick at the higher temperature of 700° F., the relationship of these hexagonal crystals to each other, and probably the positioning of certain of the atoms of both the phosphorous and the silicon, when the temperature passes about 650° F., changes. A lamellar structure of silicon phosphate is very slightly water soluble, so slight that the action of the water vapor suspended in air has no appreciable effect. Applicant has submerged No. II bricks in water for several weeks and has found that there is a slow reaction which softens the surface. Apparently the hexagonal silicon phosphate crystals in their relationship at temperatures below 680° F. permit a rapid entrance of water particles and a quick reaction with the phosphates, whereas these same crystals in the lamellar structure bar the entrance of water particles. The water particles gain entrance only by breaking the layers one at a time, apparently a very slow process.

At any event, it is clear that raising the temperature of the mix to a point where the hexagonal silicon phosphate crystals relate themselves to each other in a lamellar structure renders the brick insoluble with water for all practical purposes.

Referring to the drawing, the crystal structure of the silica which does not enter the reaction with the phosphoric acid remains the same throughout the entire brickmaking process. This silica does not change from alpha quartz to beta quartz until the temperature has reached 932° F. (approximately).

As for the structure of the silicon phosphates, the water insolubility increases as the temperature rises. The probability is that some silicon phosphates are formed even during the mixing period. As the temperature rises, the reaction is speeded. When the temperature reaches approximately 480° F., two molecules of orthophosphoric acid ($H_3PO_4$) combine to release a molecule of water and produce pyrophosphoric acid ($H_4P_2O_7$). Thus orthophosphoric acid may be used but due to its poor adhesive properties would not be used with pure silica unless another binder were also present, and such binders have the disadvantage of lowering P. C. E. or decreasing density. At 572° F., pyrophosphoric acid breaks down into metaphosphoric acid, without the presence of any other element. Concurrently with the reaction between the phosphoric acid and the silica, therefore, the phosphoric acid is itself changing, and as it attains less hydrated forms it is believed to promote the speed of the reaction with the silica.

*Substitution of materials*

Alpha quartz is commonly found in nature in various sandstones. Quartz rock and Sharon conglomerate from Ohio may be used. Sharon conglomerate has the composition of 98.0% $SiO_2$, 0.90% $Al_2O_3$, 0.9% $Fe_2O_3$, 0.3% $CaO$, and 0.2% $K_2O$, $Na_2O$, and a trace of $MgO$. Applicant has made bricks of each and finds that the true end product, that is, the product, whatever it is after it has been heated in the open hearth furnace, is satisfactory provided the percentage of silica in the raw material is high. The silica does not necessarily need to be in the alpha quartz form for use in applicants' process, but most silica raw material is in this form. Any crystalline form of silica will work in applicants' chemically bonded process. The satisfactoriness of a silica brick for high temperature use is dependent upon freedom from fluxes in the raw material. Where a silica brick is intended for use at temperatures under 3000° F., the percentage of other compounds than silica may be higher. This rule applies to applicants' chemically bonded silicon brick.

Applicant has made bricks by the foregoing process from both ordinary quartz rock and Sharon conglomerate and finds that the strength, the hardness, and the water insolubility characteristics are substantially the same as the brick made from ganister.

As above suggested, the acid that applicant finds most effective is pyrophosphoric acid. Applicant has made an experimental batch of bricks employing pyrophosphoric acid in a liquid state. He has done the same with mixtures of metaphosphoric and pyrophosphoric. The bricks are indistinguishable. The probability is that the higher the phosphoric acid, the more complete the reaction of the phosphoric acid with the silica. However, there is no evidence that the temperature at which a particular phosphoric acid molecule combines with a silica has any effect on the relationship of the hexagonal prism silicon phosphates, whether they be related heterogeneously or in a lamellar structure. If the temperature at which these hexagonal prism silicon phosphates move from a heterogeneous to a lamellar or layered relationship is about 680° F., the formation of a silicon phosphate above this temperature does not deter its falling properly into the lamellae lattice. Orthophosphoric acid is considerably less expensive than pyrophosphoric or metaphosphoric acids but is not sufficiently viscous to bond together silica particles before conversion to a phosphate. Consequently, it would not ordinarily be used with refractory compounds predominantly silica unless some other bonding agent were also present.

Mixing is important to the extent that a good dispersement of the phosphoric acid in the silica will be obtained. Only a small percentage of the silica combines with the phosphoric acid to form the silicon phosphates.

The rate of applying heat is not important. The drying furnace is maintained at 700° F. and it requires two or three hours to bring the bricks fully to this temperature. This will depend upon the shape of the bricks and the volume. The drying process involves not only the combining of the phosphorous and the silicon but the removal of released water molecules. This should be as complete as possible because the water molecules adversely affect the lamellar lattice.

It is thus seen that the invention is broad in scope and is not to be restricted excepting by the claims, in which it is our intention to cover all novelties inherent in the invention as broadly as possible, in view of prior art.

What we claim as new and desire to secure by Letters Patent is:

1. The method of making a silica refractory body which comprises mixing particles of alpha quartz with 4–10% by weight of pyrophosphoric acid, forming the mixture into a shaped body, and heating the body at a temperature of approximately 700° F. to form a bond of water resistant silicon phosphate.

2. A silica brick consisting essentially of approximately 90% to 96% silica bonded together by 4% to 10% by weight of pyrophosphoric acid.

3. A silica brick comprising silica particles consisting essentially of 90–96% by weight crystobalite bonded together with pyrophosphoric acid.

4. A refractory body consisting of approximately 90% to 96% alpha quartz bonded together by 4% to 10% by weight of a water resistant silicon phosphate of greater water resistance than prismatic hexagonal silicon phosphate.

5. A refractory body consisting essentially of 90–96% by weight of silica particles bonded together with 2–10% by weight of lamellar silicon phosphate.

6. A refractory body consisting of approximately 90% to 96% of ganister bonded together by 4% to 10% by weight of lamellar silicon phosphate.

7. The method of making a silica refractory which comprises dry pressing into a shaped body a composition consisting essentially of 95% of alpha quartz and 5% of pyrophosphoric acid, and heating the composition at a temperature of approximately 700° F.

8. A refractory body consisting essentially of approximately 90% to 96% silica bonded together by 4–10% by weight of a water resistant silicon phosphate.

9. The method of making a silica refractory which comprises forming into a shaped body a composition consisting essentially of 90–96% quartz and 4–10% of pyrophosphoric acid, and heating the shaped body at a temperature above approximately 680° F. and below the decomposition temperature of the water resistant silicon phosphate bond so formed.

10. A silica brick consisting essentially of 90–96% quartz with the balance being silicon phosphate intimately dispersed throughout the quartz.

References Cited in the file of this patent

UNITED STATES PATENTS

| 1,420,284 | Rebuffat | June 20, 1922 |
| 2,521,614 | Valyi | Sept. 5, 1950 |

FOREIGN PATENTS

| 1,925 | Great Britain | 1910 |
| 674,247 | Great Britain | 1952 |

OTHER REFERENCES

Mellor: A Comprehensive Treatise on Inorganic and Theoretical Chemistry, 1947, pp. 990 and 991.